US006021854A

United States Patent [19]

Scarola

[11] Patent Number: 6,021,854

[45] Date of Patent: Feb. 8, 2000

[54] ADAPTER HANDLE FOR POWER TOOL

[76] Inventor: Ralph Scarola, 339 Hoover Ave. South, Edison, N.J. 08837

[21] Appl. No.: 09/066,986

[22] Filed: Apr. 24, 1998

[51] Int. Cl.[7] .............................. B23B 45/14; B27C 3/08

[52] U.S. Cl. .............................. 173/170; 173/141

[58] Field of Search .............................. 173/170, 171, 173/30, 36, 141; 16/114 R; 408/241 R, 136, 712

[56] References Cited

U.S. PATENT DOCUMENTS

| | | | |
|---|---|---|---|
| 2,405,110 | 8/1946 | Bullock | 173/141 |
| 2,440,852 | 5/1948 | Elford | 408/712 |
| 2,720,125 | 10/1955 | Palik | 408/136 |
| 2,879,677 | 3/1959 | Baublitz | 173/141 |
| 2,947,204 | 8/1960 | Pine et al. | 173/141 |
| 3,985,188 | 10/1976 | Steele | 173/170 |
| 4,136,579 | 1/1979 | Robinson et al. | 173/36 |
| 4,736,804 | 4/1988 | Giebel | 173/36 |
| 4,740,119 | 4/1988 | Lierz | 408/136 |
| 4,818,155 | 4/1989 | Belknap | 173/36 |
| 5,244,048 | 9/1993 | Moorhead, Sr. | 173/141 |
| 5,295,620 | 3/1994 | Cousineau et al. | 173/170 |
| 5,322,397 | 6/1994 | Spear | 173/36 |
| 5,546,749 | 8/1996 | Couchee | 173/170 |
| 5,598,892 | 2/1997 | Fox | 173/170 |

*Primary Examiner*—Peter Vo
*Assistant Examiner*—Jin Calve
*Attorney, Agent, or Firm*—Clifford G. Frayne

[57] ABSTRACT

An adaptor handle for a power tool, and in particular, for a hammer and chipping gun, which allows the operator to operate the hammer and chipping gun from a standing erect position as opposed to a kneeling or squatting position the adaptor handle being an elongate longitudinal handle with securing members affixed thereto and dimensioned and designed to be secured to the hammer and chipping gun, the elongate longitudinal handle being of sufficient length to allow the operator to operate the hammer and chipping gun from an erect standing position.

1 Claim, 4 Drawing Sheets

ADAPTER HANDLE FOR POWER TOOL

BACKGROUND OF THE INVENTION

1. Field of the Invention

The present invention relates to a handle or more particularly, to an adaptor handle for power tools which would normally require the operator to operate the tool in a kneeling or squatting position wherein this adaptor handle allows the power tool to be operated from a standing position.

2. Description of the Prior Art

Power tools are manufactured for a variety of purposes and come in a variety of sizes. The homeowner is familiar with tools sized for work about the house such as a power drill, power screw driver, power sander and the like. Each of these tools comes in larger and more industrial strength sizes for use by various building and construction trades.

The present invention is directed towards an industrial strength tool commonly used by contractors and referred to as a hammer drill or chipping gun. The tool consists of a housing having a handle portion and a body portion containing a motor and a reciprocating gearing mechanism. A chisel or other type of drill bit is removably secured to the housing at the end opposite the handle. The typical hammer drill or chipping gun is used to smooth surfaces such as concrete floors and remove irregular surfaces or in the alternative with a change in bit can be used to break up surfaces such as irregular concrete or other undesirable material. The power tool operates in a reciprocating action and because of its size and design, is typically utilized by the operator in either a kneeling, squatting or sitting position. This requires the operator to move around on his hands and knees in an awkward posture and does not lend itself to the efficient use of the tool or the operator's time.

The Applicant has developed an adaptor handle for fitting onto hammer drills or chipping guns which allows the operator to operate the tool in an efficient manner from a standing or erect position. This in turn allows the operator to move about more efficiently in a comfortable posture position and to work more efficiently on the surface to which he is applying the operation of the hammer drill or chipping gun. The handle is fashioned so as to be secured to the hammer drill or chipping gun in a secure manner in order to maintain its integrity despite the reciprocating action of the hammer drill or chipping gun. It allows the operator to control the power to the hammer drill or chipping gun from this extended handle.

The purpose of the adaptor handle is to allow the operator to move about more efficiently in a more comfortable position while not affecting the purpose in operation of the power tool.

OBJECTS OF THE INVENTION

An object of the present invention is to provide for a novel adaptor handle for a power tool which allows the operator to operate the power tool of a standing or erect position as opposed to a kneeling or squat position.

A further object of the present invention is to provide for a novel adaptor handle for a power tool which can be easily secured to the power tool and does not interfere with the operation of the power tool.

A still further object of the present invention is to provide for a novel adaptor handle f or a power tool which allows the operator to move about more efficiently in operating the power tool.

A still further object of the present invention is to provide for a novel adaptor handle for a power tool which allows the operator to control the power to the power tool from the adaptor handle.

SUMMARY OF THE INVENTION

An adaptor handle removably securable to hammer drill or chipping gun, the adaptor handle having two U-shaped brackets sized to engage the housing of the hammer drill or chipping gun, the U-shaped members having a longitudinal elongate handle member affixed thereto which permits the operator to operate the hammer drill or chipping gun from a standing or erect position as opposed to the heretofore kneeling or squatting position.

BRIEF DESCRIPTION OF THE DRAWINGS

These and other objects of the present invention will become evident particularly when taken in light of the following illustrations wherein.

DETAILED DESCRIPTION OF THE DRAWINGS

Figure 1:
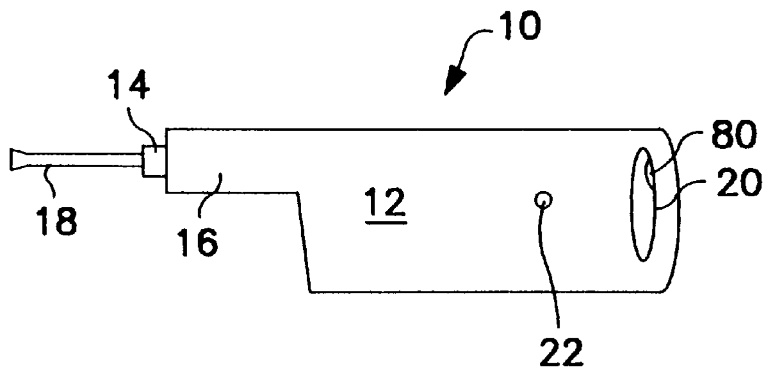
FIG. 1 is a side view of the hammer drill or chipping gun.

FIG. 1 is a side view of a typical hammer drill or chipping gun 10. The hammer drill or chipping gun 10 comprises a housing 12 in which there is now positioned an electric motor and gearing mechanism which will impart a reciprocating action to bit holding element 14. Bit holding element 14 is positioned in the protruding nose portion 16 of housing 12 and is designed to accept and secure a mechanic bit such as a chisel 18 as shown, or other suitable mechanical bit depending upon the job and the surface upon which the hammer drill or chipping gun is being used. Typically, the hammer drill or chipping gun 10 has a first handle member 20 formed in housing 12 at the end opposite nose protruding portions 16. In addition, the hammer drill or chipping gun 10 may have a threaded receptacle 22 of both lateral sides of housing 12 as more particularly shown in FIG. 2 for the receipt of a threaded second handle member 24 which may be threaded into either the left or right threaded receptical 22 depending upon whether or not the operator is right handed or left handed.

Figure 2:
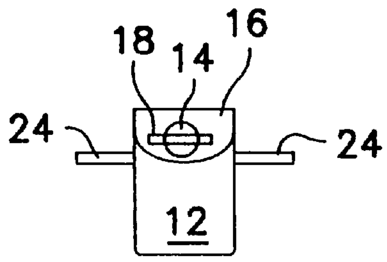
FIG. 2 is an end view of the hammer drill or chipping gun.

FIG. 2 is an end view of the hammer drill or chipping gun 10 illustrating the location of second handle means 24 and providing an end profile of the tool.

Figure 6:
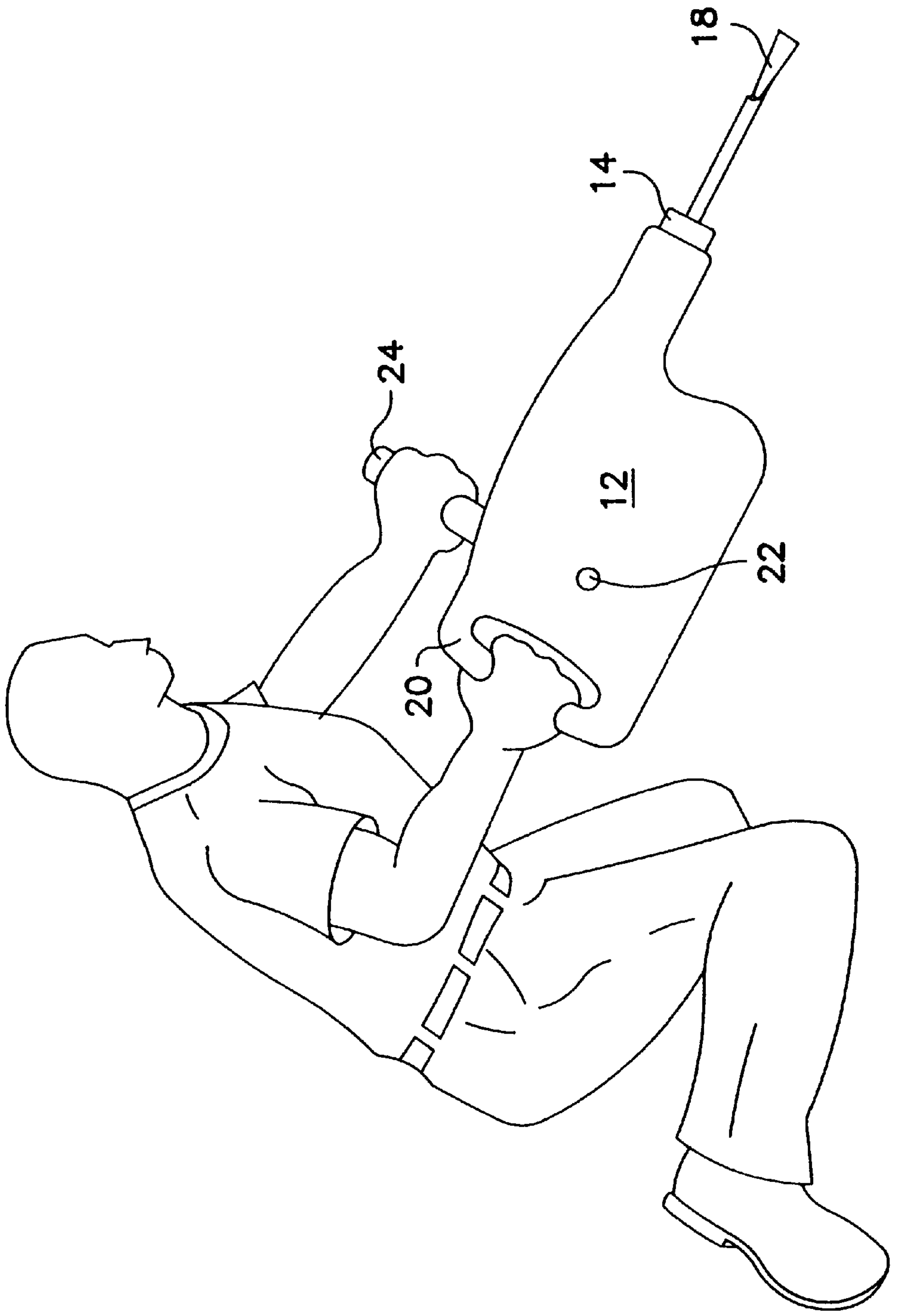
FIG. 6 is a side view of the manner in which an operator would utilize the hammer drill or chipping gun without the adaptor handle.

As stated, typically the tool is grasped by first handle member 20 by the operator utilizing his predominant hand (left handed or right handed) and the second handle member 24 is installed and threaded receptical 22 to be grasped by the opposing hand. Typically, the operator when operating the hammer drill or chipping gun 10 on a flat planar or horizontal surface, normally performs while either crouched or squatted or kneeling on the surface as he or she applies the reciprocating action of the hammer drill or chipping gun 10 to the surface to be acted upon. This is illustrated in FIG. 6 which shows a typical position for operation of the power tool. In this position, the operator is limited in movement and also finds himself in a posture situation which is not condusive to a relaxed working condition.

Figure 3:
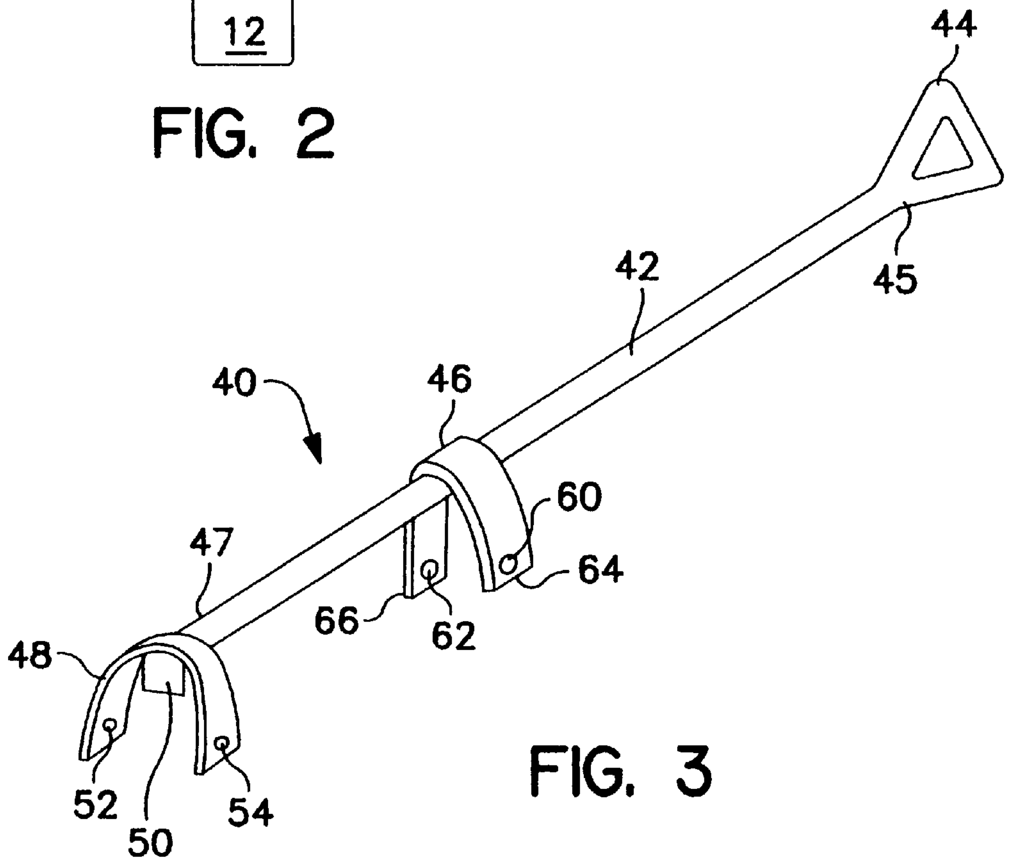
FIG. 3 is a perspective view of the adaptor handle.

A first embodiment of Applicant's adaptor handle is illustrated in FIG. 3 which is a perspective view of the adaptor handle 40. This embodiment of adaptor handle 40 is designed and structured for use with a hammer drill or chipping gun having threaded receptacle 22 formed in the lateral sides of the housing 12. The adaptor handle comprises an elongate longitudinal bar 42, preferably circular in cross sectional area having a cross member 44 secured to a first end 45 and designed to grasped by the operator with one of the operator's hands. Positioned on elongate longitudinal bar 42 are a first U-shaped securing member 46 and a second U-shaped securing member 48. Preferably, elongate longitudinal bar 42 is rigidly secured to first U-shaped member 46 and second U-shaped member 48 by a spot weld or similar securing means at the inner apex of each of the U-shaped members 46 and 48. Elongate longitudinal bar 42 also has a stop plate member 50 secured to its lower end 47 opposite cross member 44. Again, stop plate member 50 is rigidly secured to elongate longitudinal bar 42 by a spot weld or similar rigid securing mechanism. The second U-shaped member 48 has apertures 52 and 54 positioned approximate to its end points 56 and 58. Apertures 52 and 54 are in alignment for the receipt of a securing member in the form of a nut and bolt as will be described hereafter.

First U-shaped member 46 also has apertures 60 and 62 formed approximate to end points 64 and 66. The curvature and dimensions of first U-shape member 46 are designed such that apertures 60 and 62 will line up with threaded bore 22 on each lateral side of the hammer drill or chipping gun 10. The curvature and dimensions of second U-shaped member 48 are such that they embrace about nose portion 16 of housing 12 of hammer drill and chipping gun 10 and permit the passage therethrough of a securing means.

Figure 4:
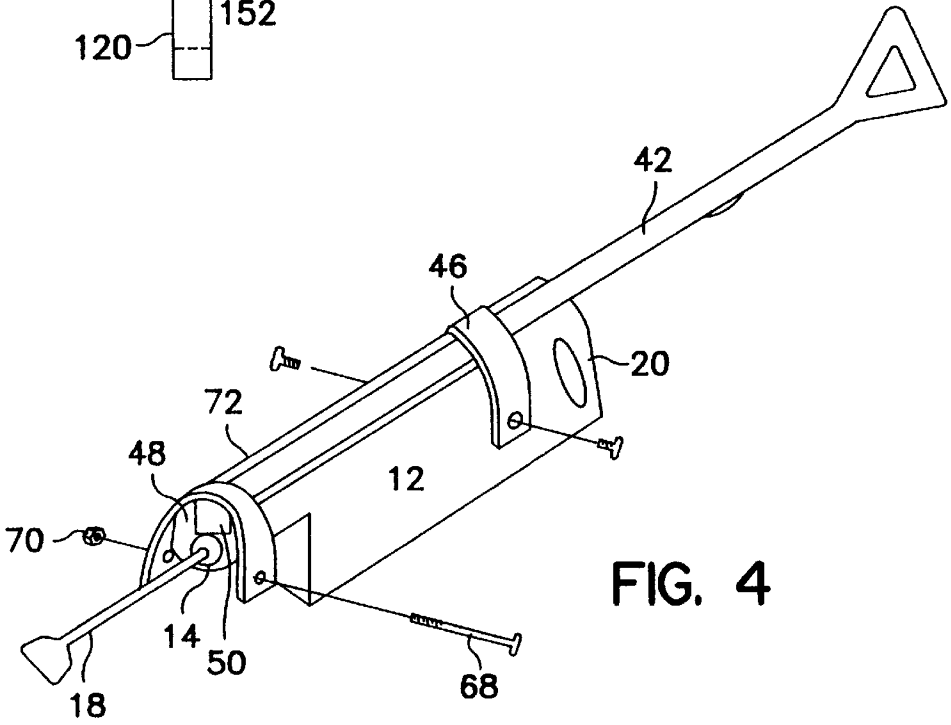
FIG. 4 is a perspective view of the hammer drill and chipping gun with the adaptor handle attached thereto.

Stop plate 50 is secured to the lower end 47 of elongate longitudinal bar 42 and extends beyond the cross sectional area of elongate longitudinal bar 42. Stop plate 50 while being secured by a weld or similar mechanism to the lower end of elongate longitudinal bar 42 is also secured by welding or other suitable mechanism to the lower edge of second U-shaped member 48. The positioning and securing of first U-shaped member 46 and second U-shaped member 48 on elongate longitudinal bar 42 is dictated by the particular size of the hammer drill or chipping gun 10 to which it is to be secured. The second U-shaped member 48 is designed to embrace the nose portion 16 of housing 12 proximate to bit securing means 14 such that the stop plate 10 is engaged and in contact with the protruding end of nose portion 16 yet does not interfere with the reciprocating action of bit holding member 14. As shown in FIG. 4, the second U-shaped member 48 is then secured in position by a bolt and nut combination 68 and 70 secured through alignable apertures 52 and 54.

First U-shaped member 46 is positioned and secured to elongate longitudinal bar 42 such that when the adaptor handle 40 is positioned along the upper surface 72 of housing 12, apertures 60 and 62 will be in alignment with threaded bore 22 on the lateral sides of the power tool. First U-shaped member 46 is then secured to the housing by means of a threaded fastener complimentary with threaded bore 22.

In this final configuration, the adaptor handle 40 is secured to the hammer drill or chipping gun 10 such that stop plate 50 is in engageable contact with the end portion of nose portion 16 of housing 12 and second U-shaped member 48 embraces nose portion 16 proximate to its end with elongate longitudinal bar 42 extending along the upper surface of the hammer drill or chipping gun 10. First U-shaped member 46 embraces the elongate longitudinal bar 42 and a portion of the housing 12 such that apertures 60 and 62 are alignable with threaded bore 22 for the receipt of a threaded securing means complimentary with threaded bore 22. In this configuration, the reciprocating vibrating action of the power tool will not dislodge the adaptor handle since it is rigidly secured to the housing by means of the first U-shaped member 46 and is frictionally secured to the housing by means of the second U-shaped member 48 embracing the nose portion while simultaneous having a stop plate engaging the end of the nose portion. The dimensions are such that it will not interfere with the bit member and the reciprocating action of the tool such that a chipping bit 18 or other suitable bit may be installed and secured into bit holding member 14 for whatever particular job the tool is to be used for.

Figure 5:
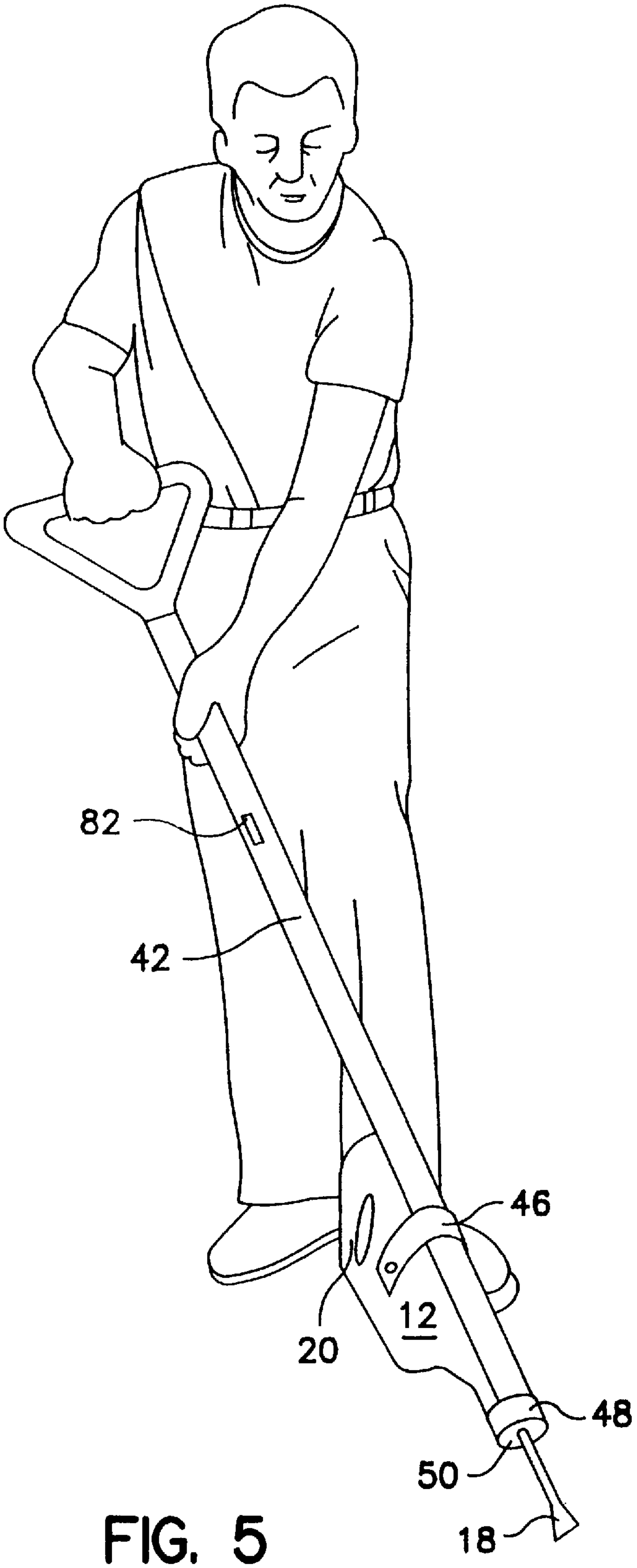
FIG. 5 is a perspective view of an operator utilizing the hammer drill or chipping gun with the adaptor handle.

The adaptor handle as illustrated and described permits the operator to utilize the tool while in an erect, posture relaxed position as shown in FIG. 5. The operator can grasp elongated longitudinal bar 42 in whatever manner he so desires depending upon whether he has a left handed or right handed proclivity and can place both hands on the elongate longitudinal bar 42 or one hand on elongate longitudinal bar 42 and the other hand on the cross bar member 44. This permits the operator to work in a standing position and to move more freely about the work space thus improve his or her work efficiency.

The power control for the hammer drill or chipping gun 10 is normally positioned within first handle means 20 and normally consists of an on/off switch 80. The operator can utilize the hammer drill or chipping gun 10 with the adaptor handle 40 and still reach down to operate the power switch, on/off switch 80 with little difficulty. However, a mechanical action switch 82 secured to elongate longitudinal bar 42 is in communication with power switch, on/off switch 80 could be installed to allow the operator to activate or deactivate the power control from a position on elongate longitudinal bar 42 by mechanical means. Still further, if one so desired, one could rewire the circuitry such that an electrically powered on/off power switch could be positioned on elongate longitudinal bar 42 for activation and deactivation of the hammer drill or chipping gun 10. The size and weight of the hammer drill or chipping gun 10 can vary depending upon the manufacturer. Applicant has fashioned the adaptor handle of light weight steel in order to provide for a sturdy support and handle as well as to maintain its secured nature to the tool where the tool is operating in a reciprocating manner. Applicant's invention is not limited to an adaptor handle manufactured from light weight steel, but could also be manufactured from a heavy duty plastic material depending on the weight of the tool and the rate of reciprocating action of the tool.

The embodiment of the adaptor handle as illustrated in FIGS. 1 through 4 is with respect to a hammer drill or chipping gun of a design such that there are two threaded bores 22 on opposing lateral sides of the housing which are originally designed for the receipt of a second handle means, but are utilized in the first embodiment of the adaptor handle to secure the second securing member to the housing. Certain power tools and chipping guns vary in housing designs such that the aforesaid threaded bores 22 are not present in the housing. Still further, because of the design of the operating end of the power tool, it may be necessary to relocate the stop plate towards the handle portion of the housing of the power tool. Therefore, another embodiment of the adaptor handle is illustrated in FIGS. 7 and 8 wherein FIG. 7 is a side view of a second mounting means and stop plate position and FIG. 8 is an end view from the handle end of the power tool.

In this embodiment, the hammer drill/chipping gun 110 still comprises a housing 112, a bit holding element 114 positioned in a protruding nose portion 116 and a first handle member 120. In this embodiment, adaptor handle 140 still comprises an elongate longitudinal bar 142 having a first end 145 and a second end 147. In this embodiment, the first securing member 146 is not U-shaped in configuration, but is dimensioned and shaped to conform to the particular shape of the nose protruding operating end 116 of power tool 110. In this configuration, the first securing member 146 is secured to the elongate longitudinal bar 142 in the same fashion as it is secured in the first embodiment, however, the securing by a fastener means.

The absence of threaded bores 22 on the lateral sides of the housing of some power tools identified as hammer drills or chipping guns requires that the second securing member 148 cooperate with and engage the handle end 120 of power tool 110. In this configuration, a similar clamping device as 146 could be utilized to engage a portion of handle end 120 or alternatively, as illustrated in FIG. 8, a pair of planar cross bars 151 and 152 could be utilized with fastening means 154 to engage a portion of handle end 120. In this configuration, cross bar 152 would be secured to elongate longitudinal handle 142 in the manner similar to that disclosed with respect to the first embodiment, with cross bars 150 and 152 having alignable apertures for the receipt of a fastening means in order to frictionally engage a portion of handle end 120 and thus secure elongate longitudinal bar 142 at a second position to the housing 112 of the power tool 110. A split ring fastener could also be utilized in cooperation with the handle.

Figure 7:
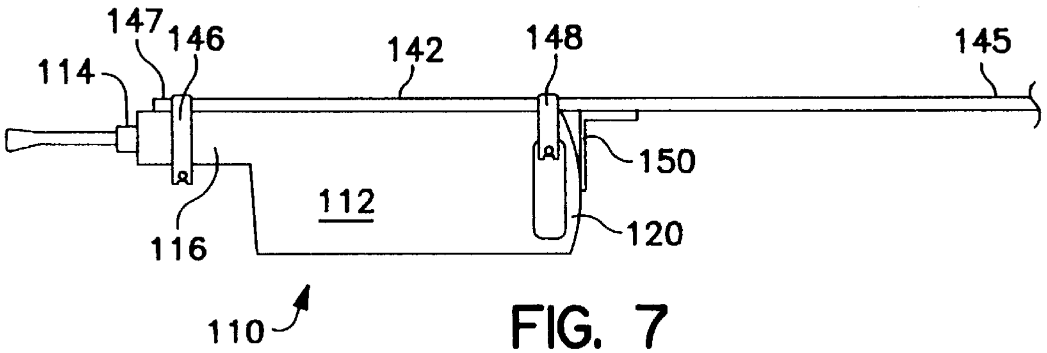
FIG. 7 is a side view of a second embodiment of the adaptor handle.
Figure 8:
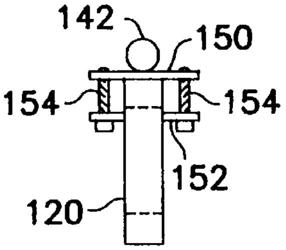
FIG. 8 is an end view of the second embodiment.

FIG. 7 also illustrates a second embodiment regarding the placement of stop plate 150. Due to the design of some hammer drill and chipping guns, the stop plate cannot be positioned so as to engage the housing at operating end 116 and since it is necessary to insure that the elongate longitudinal bar remains secured to the housing during the reciprocating action of the power tool, it is feasible to relocate the stop plate 150 to a position on elongate longitudinal bar 142 between second securing means 148 and adaptor handle end 145. In the configuration illustrated in FIG. 7, the stop plate 150 is L-shaped in cross-sectional area and is secured to the elongate longitudinal bar or handle 142 having a portion thereof perpendicular to elongate longitudinal handle 142 so as to frictionally engage the rear portion of handle 120 when the adaptor handle is fully secured to the housing of the power tool. It will be noted that with respect to cross bars 150 and 152 of the second securing member as illustrated in the second embodiment as well as with respect to stop plate 150, the surfaces thereof may be slightly arcuate or curved in order that they may better engage the surfaces of handle portion 120 of the power tool which in normal instances would have some degree of curvature to them for comfort relating to the operator.

This second embodiment illustrates the ability of the adaptor handle to be slightly modified in order to accommodate power tools of the type discussed in which the housings differ somewhat in their configuration.

While the present invention has been disclosed and illustrated with respect to the exemplary embodiments thereof, it will be recognized by those of ordinary skill in the art that many modifications may be made to the invention without departing from the spirit and scope thereof and therefore, it is manifestly intended that the invention be limited only by the scope of the claims and the equivalence thereof.

I claim:

1. An adaptor handle in combination with a reciprocating hammer and chipping gun permitting the operation of said hammer and chipping gun by an operator from an erect standing positioning comprising:

a hammer and chipping gun having a housing said housing having positioned therein a motor and gearing mechanism for implementing said reciprocating hammering action, said housing having a protruding nose portion having attached thereto a bit holding member for receipt and securing of a bit to be operated by said reciprocating hammering action, said housing having a first handle end mounted on said housing opposite said nose protruding end and a second handle member receivable into a threaded aperture on opposing lateral sides of said hammer gun; and an adaptor handle for removable affixation to said hammer and chipping gun, said adaptor handle comprising an elongate longitudinal handle member having a first end and a second end; and a second planar U-shaped member secured to said second end of said elongate longitudinal handle member, said second U-shaped member having alignable apertures proximate to the respective ends of said second U-shaped member; said U-shaped member dimensioned to embrace said nose portion of said housing of said hammer and chipping gun so as to permit a threaded securing means to pass through said apertures on said second U-shaped member to embrace and secure said second U-shaped member to said nose portion of said housing; and a first planar U-shaped member positioned on said elongate longitudinal handle between said first end and said second end, said first U-shaped member having apertures proximate to the respective ends of said first U-shaped member, said first U-shaped member dimensioned to overlap said housing of said hammer and chipping aligning said apertures on said first U-shaped member with said threaded apertures on said lateral sides of said hammer and chipping gun, said first U-shaped member secured to said housing of said hammer and chipping gun by means of threaded fasteners passing through respective apertures on said first U-shaped member and secured in said threaded aperture in said housing; and a planar stop plate secured to said second end of said elongate longitudinal handle, said stop plate having a cross-sectional area greater than the cross-sectional area of said elongate longitudinal handle, said stop plate in frictional engagement with the end of said nose portion of said housing when said first U-shaped member and said second U-shaped member are secured to said housing.

* * * * *